UNITED STATES PATENT OFFICE.

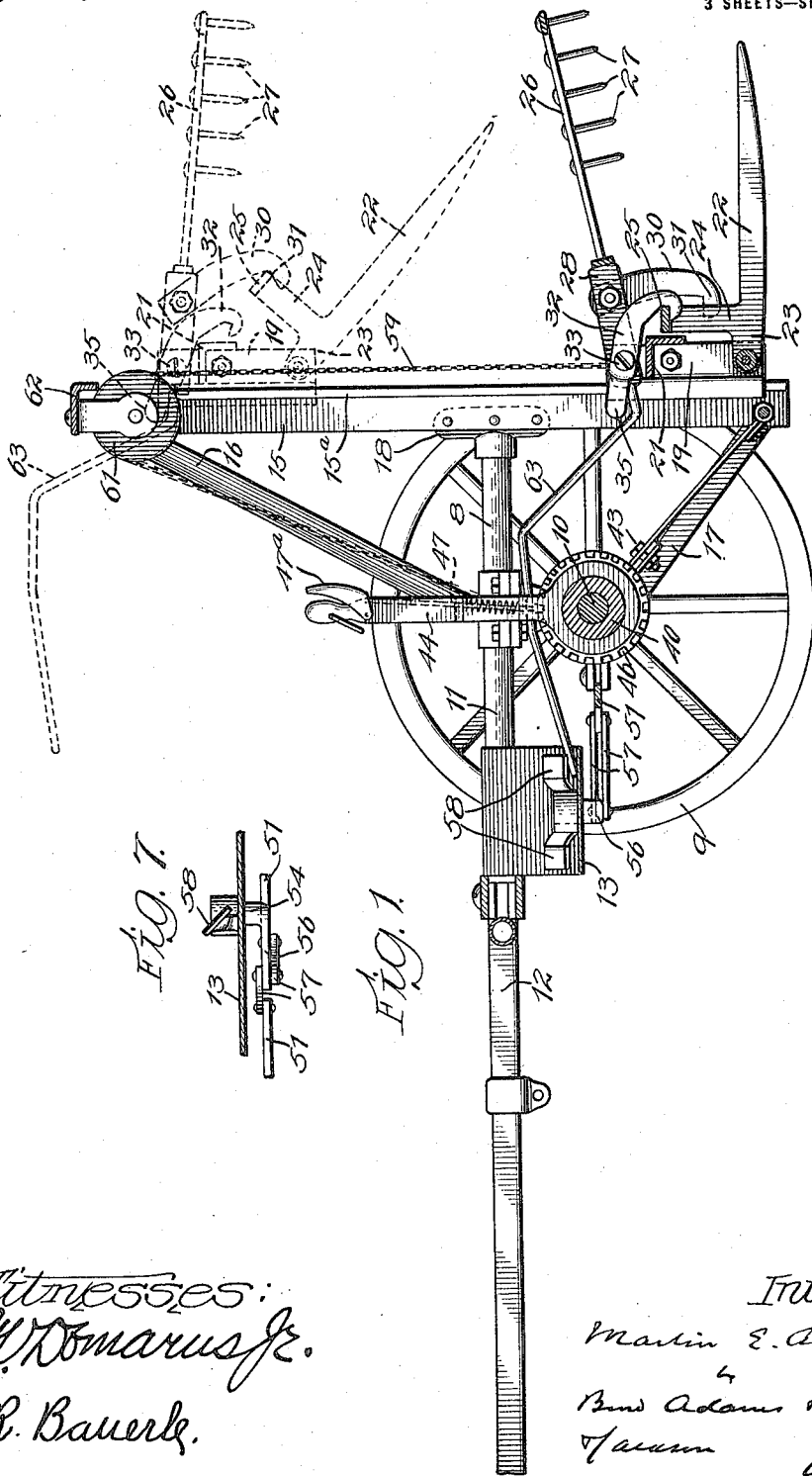

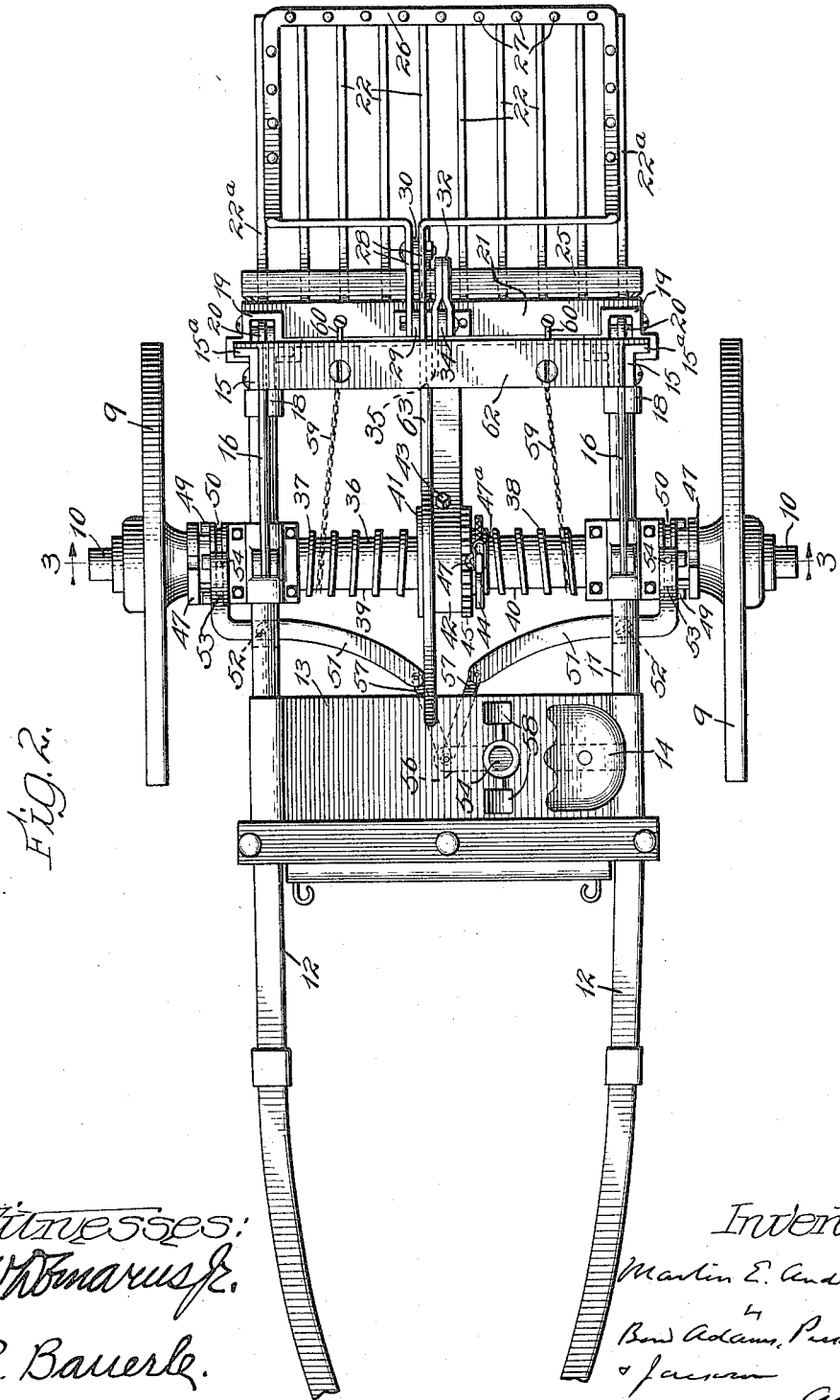

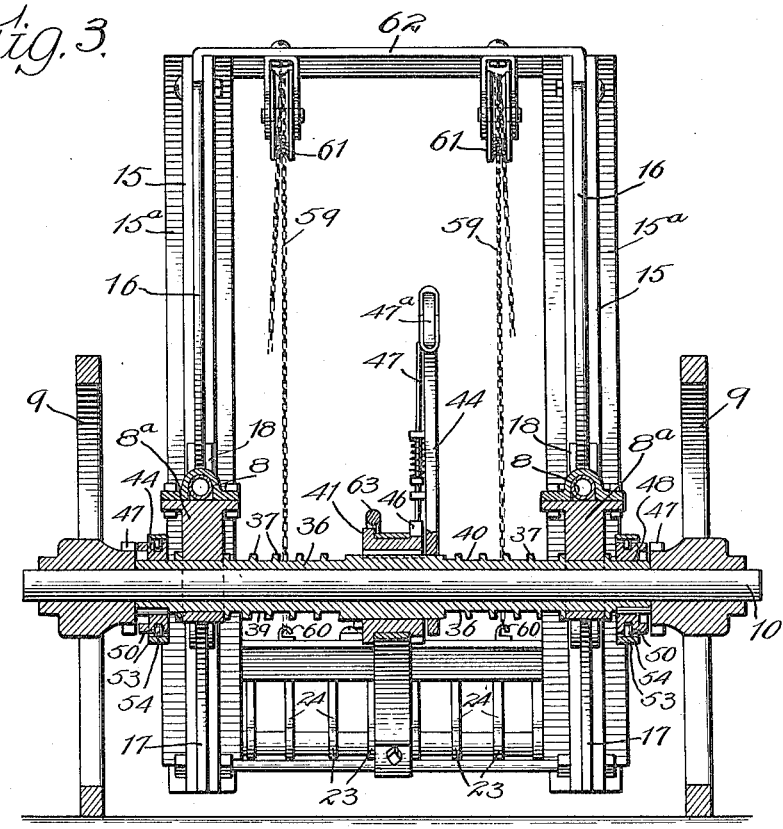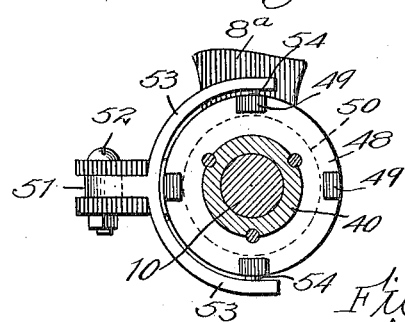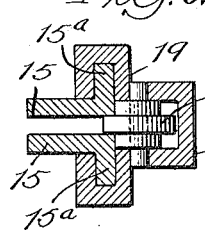

MARTIN E. ANDERSON, OF DE KALB, ILLINOIS.

MANURE-LOADER.

1,148,278.   Specification of Letters Patent.   Patented July 27, 1915.

Application filed May 3, 1912. Serial No. 694,944.

*To all whom it may concern:*

Be it known that I, MARTIN E. ANDERSON, a citizen of the United States, residing at De Kalb, in the county of Dekalb and State of Illinois, have invented certain new and useful Improvements in Manure-Loaders, of which the following is a specification, reference being had to the accompanying drawings.
My invention relates to machines for loading and carrying away and delivering manure and similar substances and its object is to provide a new and improved mechanism by which manure or similar substances may be loaded onto the rake portion of the frame or similar devices which, when the machine is driven away to the unloading point, may be raised to a suitable distance above the ground by the operation of the wheels with the frame and which may be thereupon tilted so that its contents may be spilled or delivered.

It also has for an object to provide such suitable devices for coöperating with said rake-like portion of the frame to secure the manure thereon after it is loaded and also with suitable devices coöperating with said rake-like member for operating the same.

It has also for its object the improvement of such mechanism in further particulars as set forth in the claims.

In the drawings, Figure 1 is a side elevation partly in vertical section; Fig. 2 is a top or plan view; Fig. 3 is an end elevation in section on line 3—3 of Fig. 2; Fig. 4 is an enlarged detail being a view of the clutch-operating mechanism; Fig. 5 is an enlarged detail showing part of the frame of the rake and its method of mounting on the main frame; Fig. 6 is an enlarged detail being a cross-section through one of the uprights of the frame and through one of the sliding blocks; and Fig. 7 is an enlarged detail being a view of the foot-operated shaft, and partially in vertical section, by means of which the levers which operate the clutches are worked.

Referring to the several figures of the drawings in which corresponding parts are indicated by like reference characters, 8 indicates a frame which is mounted on carrying wheels 9 which are journaled on axle 10 which is carried by the frame 8. The axle 10 is fixed and the wheels rotate thereon.

11 indicates forward projecting side-members of the frame and 12 indicates the shafts by which the frame is driven. The side-members 11 support a plate 13 on which is mounted a driver's seat 14.
15 indicates uprights mounted on the frame 8.

16—17 indicate braces which connect the uprights 15 with the frame and hold it firmly in position. As is best shown in Fig. 6 the uprights 15 are preferably formed each of two members set a short distance apart and are connected to the frame 8 by means of a plate 18 on the side-members 11 and bolted between the uprights 15. The uprights 15 are also provided with projecting flanges 15$^a$ on which are slidably mounted blocks 19, one upon the uprights upon each side of the machine, which are so formed (as is best shown in Fig. 6) as to embrace the flanges 15$^a$ of uprights 15 so as to slide vertically thereon.

20 indicates pulleys which are journaled in the blocks 19 and bear against the surface of the flanges 15$^a$ of the uprights 15.
21 indicates a cross-bar which extends across the machine and which is bolted or otherwise suitably secured to the blocks 19 so as to rise and fall therewith.

22 indicates a carrier which is preferably in the form of a fork, as shown in the figures, which is pivoted by means of ears 23, one upon each side of its inner end, to the lower ends of the blocks 19 so that the loader 22 may swing thereon as shown in solid and dotted lines in Fig. 1. Just forward of its pivotal line the fork is provided with uprights 24 which are joined across the top by a cross-member 25 which may be integral therewith, but may be, of course, formed in any other suitable manner.

26 indicates a frame provided on its side and rear edge with downward projecting teeth 27 and having rearward extending arms 28 preferably formed integral with said frame. The arms 28 are pivoted at their inner ends to an upward projecting lug as 29 on the surface of the cross-member 21 whereby the frame may be swung up and down on its said pivot.
30 indicates a trigger pivoted between the members 28 and provided at its lower end with a catch 31 which is adapted to engage the cross-bar 25 when the support 22 is allowed to drop, as shown in dotted lines in Fig. 1, and both limit its downward movement and at the same time provide a means by which it may be raised again to normal position by the swinging of the frame 26 as hereinafter described.

32 indicates a trigger which is pivoted as at 33 on a suitable ear as 34 projecting upward from the cross-bar 21 which connects the blocks 19 as above described. The trigger is adapted to engage the bar 25 of the rake-like support 22 and normally hold it, when so engaged, in the relative position shown in full lines in Fig. 1. The trigger 32 is provided with a handle 35 projecting inward beyond its pivotal point and preferably formed integral therewith by means of which the trigger may be swung by hand by the driver so as to free it from engagement with the cross-bar 25 as hereinafter described.

36 indicates a sleeve which is rotatably mounted on the axle 10 and is journaled in suitable side-portions as 8ª of the frame 8. The sleeve 36 may be of a single piece or of several pieces fastened together, as may be desired, and extends across the machine from between the hubs of the wheels 9. As is best shown in Fig. 2 the sleeve 36 is provided with spiral flanges 37—38 which are preferably formed integral with said sleeve to form guiding grooves between them, as 39—40, for the chains hereinafter described.

41 indicates a brake-disk which is keyed or otherwise suitably secured to the sleeve 36 centrally thereof. The brake-disk 41 is embraced by a brake-band 42, of any suitable form, which acts as a brake to the disk and hence to the sleeve to resist its rotation and the pressure may be adjusted by any suitable means as by a screw 43.

44 indicates a hand-lever which is journaled at its lower end upon sleeve 36 to one side of disk 41.

45 indicates a circular ratchet which forms a part of the disk 41.

46 indicates an engaging dog, carried on a spring seated rod 47 mounted on the hand-lever 44, and operated in the usual way, by operating handle 47ª, to move the dog into and out of engagement with the ratchet-teeth of the ratchet-disk 45. By operating the hand-lever 44 and the dog 46 it is obvious that the disk 41 and hence the sleeve 36 may be rotated by hand upon the shaft 10 in either direction as may be desired.

47 indicates clutch-members which are rigidly secured to the inner end of the hubs of the wheels 9.

48 indicates clutch-members which are slidably mounted upon the sleeve 38 at each end thereof outside of the frame and are provided with engaging members 49 which are adapted when said clutch-members 48 are slid outward to engage with the clutches 47 on the hubs of the wheels 9. The clutch-members 48 are feathered or otherwise slidingly secured upon the ends of the sleeves and each is provided with an annular groove 50.

51 indicates levers which are suitably pivoted, as at 52, intermediate their ends, to the side-members 11 of the frame. The longer arms of the levers 51 extend inward and the outer arms bend forward and are provided each with a fork 53 which embraces the clutch-members 48 and which are provided on their inner ends with pins 54 which project into the grooves 50 so that when said levers 51 are swung, as hereinafter described, the clutch-members 48 may be moved into and out of engagement with the clutch-members 47 on the hubs of the wheels.

54ª indicates a vertical rock-shaft journaled on the plate 13 and provided at its lower end with a projecting arm 56. The outer end of the projecting arm 56 is connected by links 57 with the inner ends of the arms 51 whereby, when said shaft is rotated, the levers 51 are rocked to move the clutch-members 48 into and out of engagement with the clutch members 47.

58 indicates a foot-lever which is secured to the upper end of the rock-shaft 54ª and projects to each side thereof, within reach of the feet of the driver seated on seat 14, whereby he may rock the shaft 54ª in either direction by the pressure of his feet on the said foot-lever to throw the cam-members into and out of engagement.

59 indicates chains one end of which are secured to suitable hooks 60 on the cross-member 21 and which, passing over suitable pulleys as 61 which are suspended from an upper cross bar 62 connecting the uprights 15, are connected at their other ends to the sleeve 38 upon each side of the center thereof. The chains are of such length that when they are unwound they allow the bar 21, and consequently the rake-like support 22, to descend to a position shown in Fig. 1. By the rotating of the sleeve either by the rotation of the wheels and the engagement of the clutch-members, as hereinafter described, or by the operation of the hand-lever 44, the chains may be wound up upon the sleeve 36, lifting the bar 21, the attached fork and frame and other parts to the top of the vertical side-bars 15 to the position shown in Fig. 1.

63 indicates a handle, the rear end of which is secured to and preferably formed integral with one of the projecting members 28 of the frame 26, and which extends forward so as to come within reach of the driver. The lever 63 is preferably bent as shown, in order to avoid the sleeve and axle in its operations. By moving the handle 63 up or down, the frame 26 will be swung, of course, either downward or upward.

The operation of the device is as follows: The machine is driven to where it is desired to take on the load. With the fork in the lower position, the clutches disengaged, the machine is backed so as to force the fork into the stuff to be removed, or the stuff is loaded upon the fork in any appropriate way, the frame being raised to permit the filling of the fork as may be desired. The frame 26 is then lowered by the operation of the handle 63 so as to retain the load upon the fork by the engagement of the teeth 27 therewith. The machine is then driven with its load to any appropriate place. The chain is preferably so arranged with reference to the sleeve that the driving of the machine in a forward direction when the clutch-members are in engagement to cause the sleeve to rotate with the wheels, will cause the chain to be wound up and the frame and attached fork lifted, as above described. The clutch-members are thereupon operated by the driver by pressing upon the foot-lever to throw the sleeve and wheels into engagement and the machine is driven forward. The vertically movable frame and the attached fork and other devices are thereby raised to the desired height on the frame by the rotation of the wheels and the winding of the chain upon the sleeve, rotated by the engagement of the clutch-members with the wheels. When the desired spot is reached, the operator of the machine pulls down on the handle 35 of the trigger 32, which releases said trigger from the cross-bar 25 and allows the fork to drop into the position shown in dotted lines in Fig. 1, discharging its load. The driver, by pulling down on the lever 63, lifts up the frame 26 to permit the discharge. The frame in falling causes the cross-bar 25 to engage with the catch 31 on trigger 30, limiting its fall, as is best shown in dotted lines in Fig. 1. When the load is discharged, the pulling down upon the lever 63 will lift the trigger 30 and through the engagement of its lower end with the cross-bar 25 will lift the frame 22 and cause the trigger 32 to engage the cross-bar 25, thus supporting the fork 22 at its normal position for and during another operation. The height of the slide blocks 19 and the attached parts may be, of course, adjusted manually by the operation of the hand-lever 44.

It will be noted that my improved loader comprises a two-wheeled carriage with shafts or equivalent draft-devices projecting forward from the wheel axle, while the carrier is mounted back of the axle to move vertically on the guides which are also arranged at the rear of the axle. The driver's seat is located in front of the axle so that the weight of the driver and of the shafts, to a considerable extent, if not altogether, counterbalances the weight of the guides and carrier. Thus I provide a very compact machine which is easily handled in the field and places very little strain upon the draft animal or animals, since it is, to a large extent, balanced upon the wheel axle. This, so far as I am aware, is a radically new departure in implements of this character. It is also broadly new, so far as I am aware, to provide guides at the rear of a two-wheeled carriage in connection with a fork or other carrier projecting rearwardly with reference to the normal direction of travel of the machine and arranged to be moved upon said guides by the draft of the team. The claims hereinafter made are, therefore, to be construed accordingly.

What I claim as my invention and desire to secure by Letters Patent is—

1. An implement of the class described comprising a single axle, a pair of wheels for the said axle, a frame pivotally mounted on said axle, draft devices and a driver's seat on one side of the axle at the forward end of said frame, guiding means positioned on the other side of said axle to counterbalance said draft devices and the driver, a rearwardly projecting carrier movable on said guiding means and adapted to engage the material to be loaded when the implement is driven rearwardly, and hoisting mechanism operated by the forward movement of the implement for raising said carrier on said guiding means.

2. An implement of the class described comprising a pair of wheels, a single axle, a frame pivotally mounted on said axle, means on one side of the axle for hitching a draft animal, a driver's seat and operating mechanism on said frame between said axle and said hitching means, a rearwardly-projecting upwardly-movable carrier at the rear end of said frame on the other side of said axle for raising the load, said carrier being adapted to engage the material to be loaded when the implement is moved rearwardly, and means operable by the forward movement of the implement for vertically raising the carrier with the load thereon.

3. An implement of the class described comprising a pair of wheels, an axle mounted on the wheels, a frame pivotally mounted on said axle, upwardly extending guiding means carried by the frame back of the wheel axle, a pivoted rearwardly-projecting carrier movable on said guiding means and adapted to engage the material to be loaded upon the rearward movement of said implement, draft connections at opposite side of the wheel axle from said guiding means, a driver's seat between said draft connections and said wheel axle, hoisting mechanism operated by the forward movement of the implement for raising the carrier on said guiding means, means for normally holding the carrier in operative position, and means movable vertically with said carrier and coöperating therewith to hold the load thereon.

4. An implement of the class described comprising a frame, a single axle supporting said frame, a pair of wheels mounted on said axle, shafts extending forwardly from said frame and rigidly connected therewith, a driver's seat on said frame between said axle and said shafts, substantially vertical guides disposed at the rear of said frame on the other side of said axle, a rearwardly-projecting carrier movable on said guides and adapted to engage the material to be loaded when the implement is moved rearwardly, and means operated by the forward movement of the implement for raising said carrier on said guides.

5. An implement of the class described, comprising a wheeled frame, upwardly extending guides carried thereby at the rear, supports movable longitudinally of said guides, a fork pivotally connected with said supports and projecting rearwardly therefrom, means for normally holding said fork in a substantially horizontal position, hoisting mechanism operated by the forward movement of the implement for raising said supports, a rearwardly projecting pivoted member carried by said supports and overlying the fork for holding the load thereon, and a lever for rocking said rearwardly projecting member.

6. An implement of the class described, comprising a wheeled frame, upwardly extending guides carried thereby at the rear, supports movable longitudinally of said guides, a fork pivotally connected with said supports and projecting rearwardly therefrom, means for normally holding said fork in a substantially horizontal position, hoisting mechanism operated by the forward movement of the implement for raising said supports, a rearwardly projecting pivoted member carried by said supports and overlying the fork for holding the load thereon, and means carried by said rearwardly projecting member for limiting the downward swing of said fork about its pivot.

7. An implement of the class described, comprising a wheeled frame, upwardly extending guides carried thereby at the rear, supports movable longitudinally of said guides, a fork pivotally connected with said supports and projecting rearwardly therefrom, means for normally holding said fork in a substantially horizontal position, hoisting mechanism operated by the forward movement of the implement for raising said supports, a rearwardly projecting pivoted member carried by said supports and overlying the fork for holding the load thereon, means carried by said rearwardly projecting member for limiting the downward swing of said fork about its pivot, and a latch for normally holding said fork in its operative position.

8. An implement of the class described, comprising a wheeled frame, upwardly extending guides carried thereby at the rear, supports movable longitudinally of said guides, a fork pivoted to said supports, means for holding said fork normally in operative position, a sleeve adapted to be rotated by the forward movement of the implement, said sleeve having a spiral groove, and a flexible connection adapted to be wound in said groove and connected with said supports for elevating said fork.

9. In combination, wheels, a frame carried by said wheels, upright side-bars on said frame, a supporting device slidingly mounted on said side-bars, means for raising said support on said side-bars by the rotation of said wheels, a fork pivoted at its inner end on said support, a trigger mounted on said support and adapted normally to engage said fork and hold it against downward swing and also adapted to release said fork and permit the downward swing of the same, a frame pivoted at its rear end to said support and extending outward over said fork, means for swinging said frame on said support, and a trigger carried by said frame and adapted to engage said fork to limit its downward motion.

10. In combination, wheels, a frame carried by said wheels, upright side-bars on said frame, a supporting device slidingly mounted on said side-bars, means for raising said support on said side-bars by the rotation of said wheels, a fork pivoted at its inner end on said support, a trigger mounted on said support and adapted normally to engage said fork and hold it against downward swing and also adapted to release said fork and permit the downward swing of the same, a frame pivoted at its rear end to said support and extending outward over said fork, means for swinging said frame on said support, a trigger carried by said frame and adapted to engage said fork to limit its downward motion, and to raise said fork to normal position by the upward swinging of said frame.

11. In combination, a frame, an axle carried by said frame, wheels on said axle, upright members on said frame, a support slidingly mounted on said vertical members and adapted to move up and down thereon, a fork device pivoted at its rear end to said support and adapted to swing thereon, means for holding said fork in normal position or for releasing the same when desired, a rotatable member mounted on said shaft, clutch mechanism between said rotatable member and said wheels, and connections between said rotatable member and said support adapted when said rotatable member is rotated by the clutch engagement with said wheels to raise said support.

12. In combination, a frame, an axle carried by said frame, wheels on said axle, upright members on said frame, a support slidingly mounted on said vertical members and adapted to move up and down thereon, a fork device pivoted at its rear end to said support and adapted to swing thereon, means for holding said fork in normal position or for releasing the same when desired, a sleeve journaled on said shaft and having spiral ridges thereon, clutch members between said sleeve and said wheels adapted when thrown into engagement to cause said wheels when rotated to rotate said sleeve, and cords connected to said sleeve and to said movable support adapted to be wound on said sleeve when the same is rotated.

13. In combination, a frame, an axle thereon, wheels journaled on said axle, a rotatable member journaled on said axle, clutch members between said rotatable member and said wheels, mechanism for throwing said clutch mechanism into and out of engagement, upright guide-bars on said frame, a support slidingly mounted on said upright guide-bars, connections between said rotatable member and said sliding support adapted when said rotatable member is rotated by the clutch engagement with said wheels to lift said support, a fork device pivoted to said support, a trigger pivoted on said support and adapted to normally engage said fork device and hold it in desired position and to allow the same to drop when disengaged, a toothed-frame pivoted to said support above said fork device, means for swinging said frame on its pivot, and a trigger carried by said frame and adapted to engage said fork device and limit is downward swing.

MARTIN E. ANDERSON.

Witnesses:
 EVAN ERICKSON,
 DAVID BUKMAN.

Copies of this patent may be obtained for five cents each, by addressing the "Commissioner of Patents, Washington, D. C."